Jan. 4, 1944.  A. DIVINE  2,338,577
FISH-LURE
Filed March 27, 1942

Allen Divine,
INVENTOR.

BY
Victor J. Evans & Co.
ATTORNEYS

Patented Jan. 4, 1944

2,338,577

UNITED STATES PATENT OFFICE 2,338,577

FISH LURE

Allen Divine, Port Angeles, Wash.

Application March 27, 1942, Serial No. 436,498

1 Claim. (Cl. 43—46)

This invention relates to fish lures, and its primary object is to provide a lure of the plug type, which includes an elongated body having reflecting surfaces arranged thereon in a manner to reflect light rays at various angles and particularly below the lure so as to penetrate the water accordingly and thereby attract fish and cause them to strike.

Another object is to provide a fish lure that is designed and decorated with coloring matter, as well as is provided with life like eyes, to substantially simulate a live minnow, and the lure is simple in construction, inexpensive to manufacture, and externally efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing where like characters denote like or corresponding parts throughout the several views, and in which.

Figure 1:
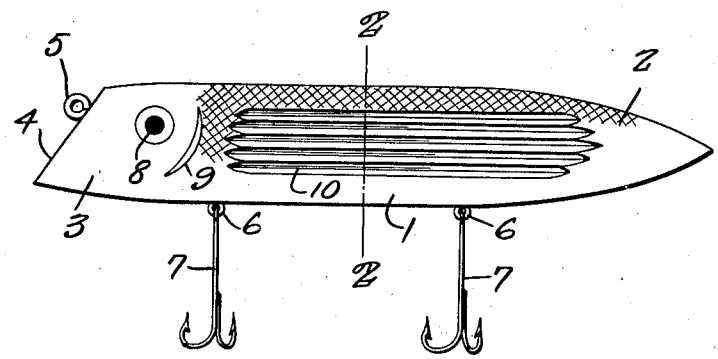
Figure 1 is a side elevation of the lure which forms the subject matter of the present invention.
Figure 2:
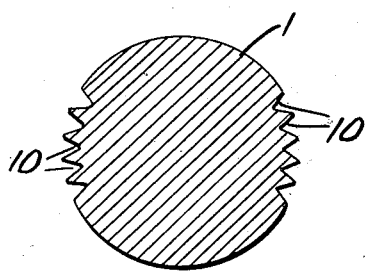
Figure 2 is a sectional view taken approximately on line 2—2 of Figure 1.

Referring to the drawing in detail, it will be noted that my lure includes an elongated solid body 1 that is substantially circular in cross section for the major portion of its length, and the rear end portion 2 is tapered inwardly to a point disposed on the longitudinal axis of the body. The forward portion 3 of the body is likewise tapered, but terminates in a flat end 4 that is inclined forwardly from the top of the body to the bottom thereof. An eyelet 5 is fixed to the front end adjacent the top thereof for connection of a trolling or casting line thereto, and a pair of spaced eyelets 6 are fixed to the bottom of the body, the latter eyelets having hooks 7 of the multiple barb type pivotally connected thereto.

Secured to the sides of the body adjacent the front thereof are eyes 8 that simulate those of a live minnow or the like, and arranged rearwardly of and adjacent the eyes 8 are substantially crescent shaped grooves 9 that simulate gills.

The sides of the body are corrugated to provide a series of parallel longitudinally extending grooves 10, some of which are longer than others, and the grooves are V-shape in cross section, as well as extend from adjacent the gills 9 for the major portion of the length of the body, as clearly shown in Figure 1. The corrugated portion or grooves 10 are coated with a lustrous or brilliant material, such as a silvering or chromium composition to provide light reflecting surfaces, so that as rays of light strike the walls of the grooves, the rays will be reflected, it being obvious that when the lure is in the water, that the rays will be directed to the lure, from a source above the same and that the walls will reflect the rays in a manner so that certain rays will be directed at a downward angle from the lure to penetrate the water below the same and thereby attract fish and cause them to strike.

The remaining portion of the body is coated with vivid coloring matter to substantially simulate the various colors and scales of a live minnow or the like, thus further rendering the lure attractive to fish.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A fish lure comprising an elongated solid body that is circular in cross section for the major portion of its length, the rear portion of the body being tapered to a point arranged on the longitudinal axis of the body and the front portion being tapered and terminating in a flat end inclined forwardly from the top of the body to the bottom thereof, the sides of the body being corrugated for the major portion of their length to provide longitudinally extending cross sectional V-shaped grooves, said grooves being coated with brilliant material to provide reflecting surfaces, the remaining portion of the body being coated with coloring matter and decorated to simulate a live minnow or the like, hooks pivotally secured to the underside of the body, and an eyelet secured to the front flat end of the body adjacent the top thereof.

ALLEN DIVINE.